United States Patent
Dancer et al.

(10) Patent No.: US 8,271,788 B2
(45) Date of Patent: Sep. 18, 2012

(54) SOFTWARE REGISTRATION SYSTEM

(75) Inventors: Andrew John Dancer, Banbury (GB); Mark Robert Chimley, Gloucestershire (GB); Adam Tuaima, Somerset (GB); Matthew Graham Baldwin, Carmarthenshire (GB)

(73) Assignee: Trend Micro Incorporated, Tokyo (JP)

( * ) Notice: Subject to any disclaimer, the term of this patent is extended or adjusted under 35 U.S.C. 154(b) by 1452 days.

(21) Appl. No.: 11/582,017

(22) Filed: Oct. 17, 2006

(65) Prior Publication Data

US 2008/0091947 A1    Apr. 17, 2008

(51) Int. Cl.
*H04L 9/32* (2006.01)

(52) U.S. Cl. ........ 713/171; 713/168; 380/201; 380/260; 726/26

(58) Field of Classification Search .................... 713/171
See application file for complete search history.

(56) References Cited

U.S. PATENT DOCUMENTS

| | | | |
|---|---|---|---|
| 2003/0051172 A1* | 3/2003 | Lordemann et al. | 713/201 |
| 2004/0187027 A1* | 9/2004 | Chan | 713/201 |
| 2006/0021057 A1* | 1/2006 | Risan et al. | 726/26 |
| 2006/0173974 A1* | 8/2006 | Tang | 709/217 |
| 2008/0118070 A1* | 5/2008 | Yeap et al. | 380/282 |
| 2009/0034714 A9* | 2/2009 | Boneh et al. | 380/28 |

* cited by examiner

*Primary Examiner* — Shewaye Gelagay
(74) *Attorney, Agent, or Firm* — Okamoto & Benedicto LLP

(57) ABSTRACT

There is described a computer network system in which a computer is in network communication with a server. In order to install a software package on the computer, installation software forming part of the software package is executed which requests entry of an email address for the user of the software package on the computer. The entered email address is then transmitted to the server, which in response sends an email to the email address including a Uniform Resource Locator (URL) addressing a local web server forming part of the software package, with installation information being appended to the URL. When the user of the computer accesses the URL using a web browser, the local web server automatically sends the installation information to the installation software. In this way, it is established that the user of the software package has access to the entered email address.

14 Claims, 6 Drawing Sheets

SOFTWARE REGISTRATION SYSTEM

FIELD OF THE INVENTION

This invention is concerned with the registration with a remote registration authority of software executed on a host computer. The invention particularly concerns the registration with the registration authority of an email address for the user of the software on the host computer.

BACKGROUND TO THE INVENTION

Many software applications now require to be registered with a registration authority, usually associated with the provider of the software, either prior to any use or prior to being able to utilise the full functionality of the software application. One piece of information which is commonly required by the registration authority is an email address for the user of the software. This may be required for the operation of the software application, to help prevent software piracy, or simply for marketing purposes. However, the verification of the submitted email address by the registration authority is a problem.

A software application for which it is important that the correct email address for the user is registered is an encrypted email application which utilises asymmetric encryption with the private and public keys for a user being calculated using the email address for the user. This allows a public key associated with the recipient of an electronic mail message to be used by the sender to encrypt the message. The resultant encrypted message can only be decrypted using a private key which is different from the corresponding public key, with access to the private key being controlled by the recipient of the electronic mail message.

As well as ensuring that a message is only read by a desired recipient, public key cryptography also enables the author of a message and the message content to be verified. In particular a digital signature can be added to the message, the digital signature being formed by encrypting a one-way hash of the message using the private key of the sender. The recipient of the message is then able to decrypt the digital signature using the public key of the sender and compare the result with a one-way hash of the received message to verify the identity of the sender and the content of the message.

SUMMARY OF THE INVENTION

An object of the present invention is to provide a software registration system which requires the user of the software to register an email address to which the user has access.

According to an aspect of the invention, there is provided a computer network system in which a computer is in network communication with a server. In order to install a software package on the computer, installation software forming part of the software package is executed which requests entry of an email address for the user of the software package on the computer. The entered email address is then transmitted to the server, which in response sends an email to the email address including a Uniform Resource Locator (URL) addressing a local web server forming part of the software package, with installation information being appended to the URL. When the user of the computer accesses the URL using a web browser, the local web server automatically sends the installation information to the installation software. In this way, it is established that the user of the software package has access to the entered email address.

In a preferred embodiment, the software package is an encryption program which performs asymmetric cryptography, and the installation information is used to establish a secure link which allows transmission of private keys to the computer.

BRIEF DESCRIPTION OF THE DRAWINGS

Various embodiments of the invention will now be described with reference to the attached Figures in which.

DETAILED DESCRIPTION

System Overview

Figure 1:
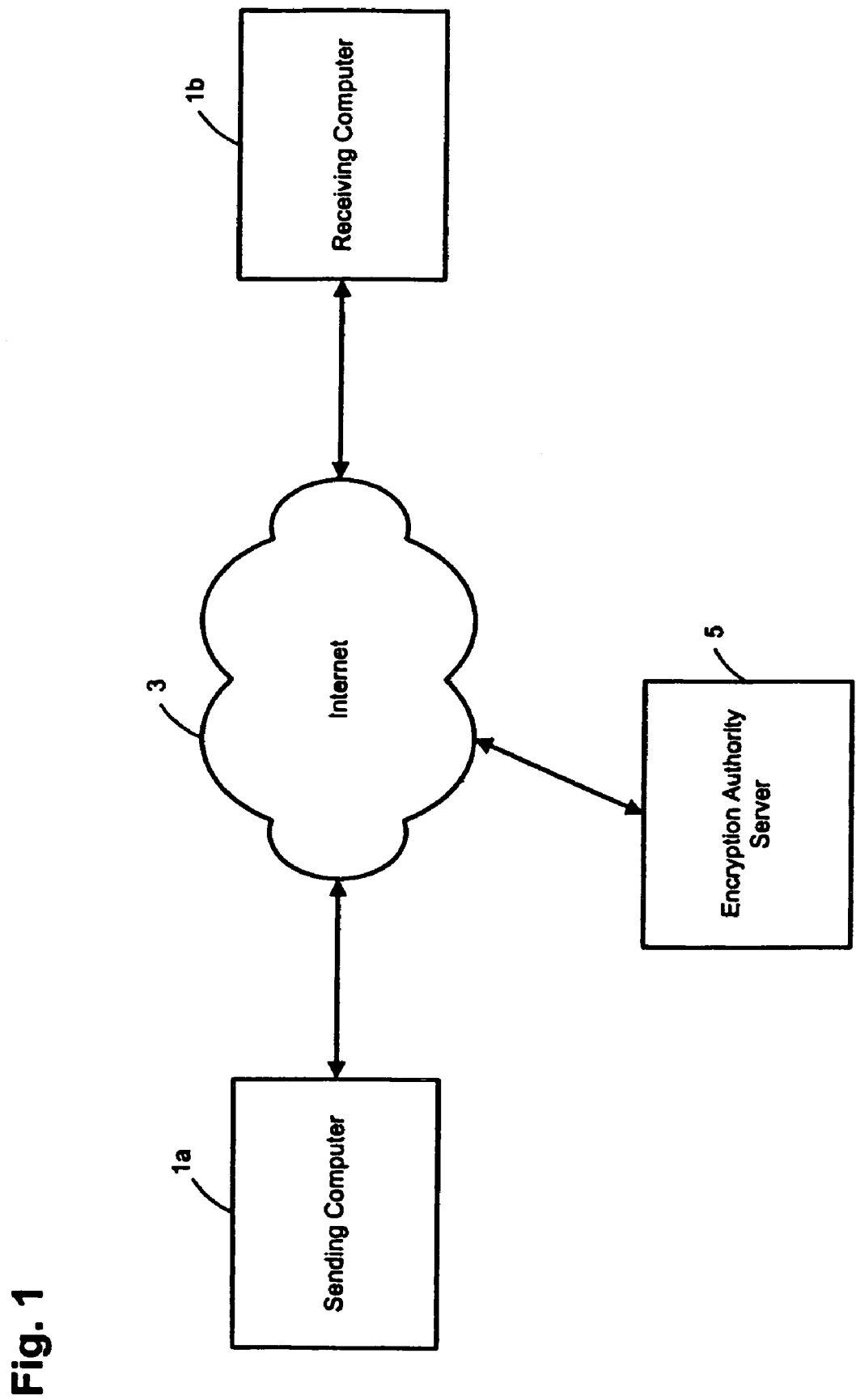
FIG. 1 schematically shows the main components of a software registration system according to the invention.

As shown in FIG. 1, in the illustrated embodiment a plurality of computers, of which only a sending computer 1*a* and a receiving computer 1*b* are shown in FIG. 1 for ease of illustration, are connected to the Internet 3. An encryption authority server 5 is also connected to the Internet 3.

The sending computer 1*a* and the receiving computer 1*b* each have an email program with an encryption plug-in which enables the sending computer 1*a* to send an encrypted email to the receiving computer 1*b*. The encryption authority server 5 provides cryptographic keys for use by the encryption plug-in to the computers 1.

In particular, in this embodiment the encryption authority server 5 issues a public key certificate providing a root public key $K^G_{pub}$ for the encryption algorithm described in WO 03/017559, the whole contents of which is incorporated herein by reference. According to this encryption algorithm, the public key $K^c_{pub}$ for a client having an electronic mail address "client_ID" is given by:

$$K_{pub}^c = F(\text{client\_ID}, K_{pub}^G)$$

where F is a publicly available function. In this way, the public key $K^c_{pub}$ associated with a client can be calculated by anyone knowing the email address of the client, the root public key $K^G_{pub}$ of the encryption authority and the function F (all of which are publicly available).

The private key associated with a client can only be calculated with knowledge of the root private key $K^G_{pri}$, which is kept secret by the encryption authority administering the encryption authority server 5. In particular, the private key $K^c_{pri}$ for a client having an electronic mail address "client_ID" is calculated by the encryption authority server 5 in accordance with the relation:

$$K_{pri}^c = G(\text{client\_ID}, K_{pri}^G)$$

where G is a function which is paired with F.

Throughout the remainder of this description, unless otherwise indicated reference to data being asymmetrically encrypted using a public key means that the data is encrypted using the asymmetric encryption algorithm described in WO 03/017559 with the public key forming the cryptographic key, and similarly reference to data being asymmetrically decrypted using a private key means that the data is decrypted using the asymmetric encryption algorithm described in WO 03/017559 with the private key forming the cryptographic key.

Reference will also be made throughout the description to data being symmetrically encrypted or decrypted using a symmetric key. Unless otherwise indicated, this refers to encryption or decryption of the data using the Advanced Encryption Standard (AES) algorithm using the symmetric key as the cryptographic key.

As the cryptographic keys are calculated using the email addresses of the users of the computers, the encryption authority wants to ensure that each private key is only distributed to someone who has legitimate access to the corresponding email address. In this embodiment, each email address has a corresponding transfer key which is used to symmetrically encrypt the private key for that email address when the private key is sent from the encryption authority server 5 to the computer 1 corresponding to the email address. During registration of an encryption plug-in, the transfer key is sent to the corresponding computer 1 in two parts, the first part being conveyed by a http signal to the computer 1 and the second part being conveyed in an email to the corresponding email address. In this way, the transfer key can only be recovered if the user of the computer 1 on which the encryption plug-in is loaded has access to the corresponding email address.

In this embodiment, the encryption plug-in includes a local web server and the email conveying the second part of the transfer key includes a Uniform Resource Locator (URL) addressing the local web server and conveying the second part of the transfer key. The user of the computer 1 simply has to enter the URL conveyed by the email into a conventional web browser program in order to initiate recovery of the transfer key by the encryption plug-in.

The encryption authority server 5 and the computers 1 will now be described in more detail.

The Encryption Authority Server

Figure 2:
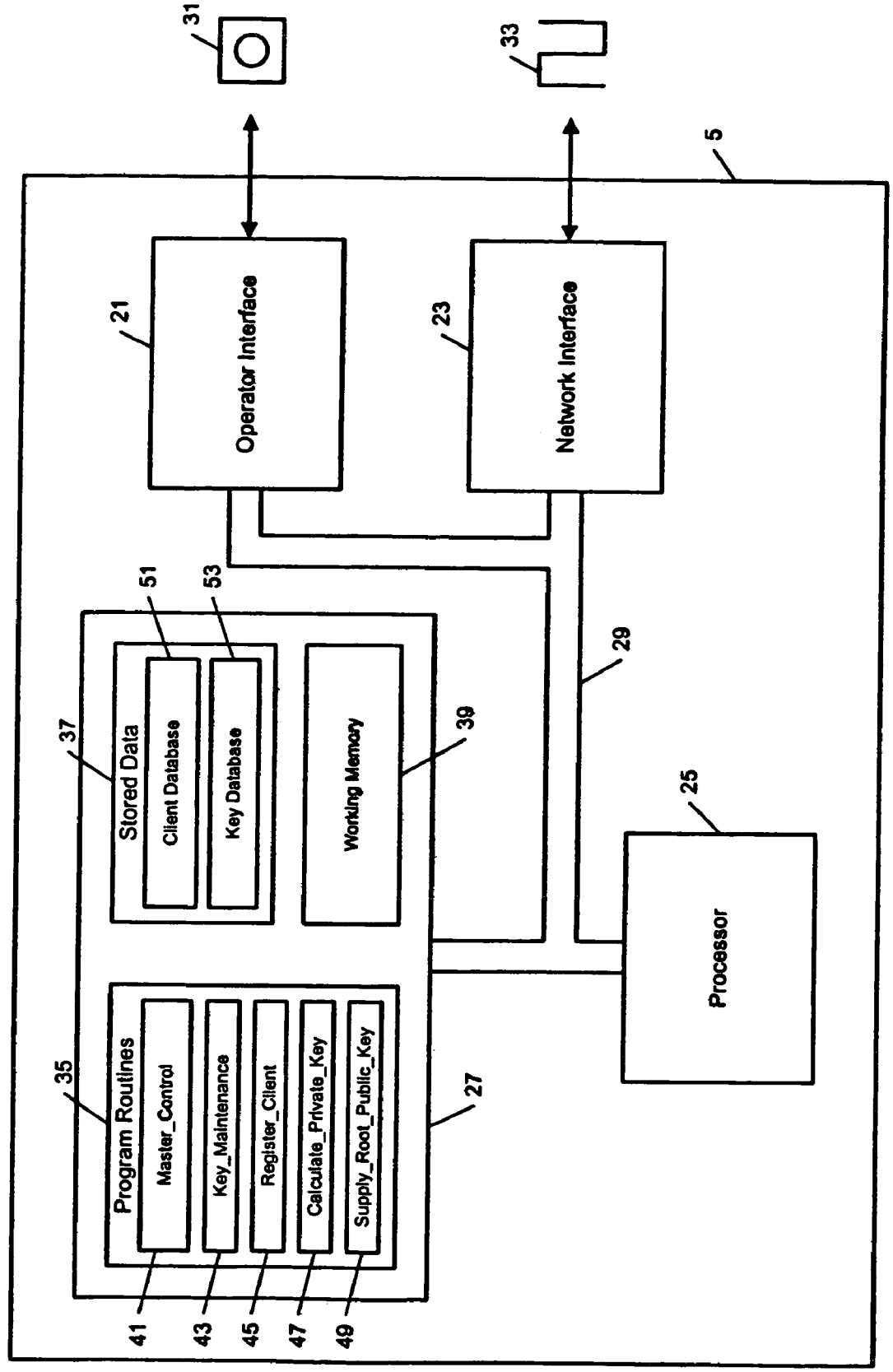
FIG. 2 schematically shows the main components of an encryption authority server forming part of the software registration system illustrated in FIG. 1.

As shown in FIG. 2, the encryption authority server 5 has an operator interface 21, a network interface 23, a processor 25 and memory 27 interconnected by a bus system 29.

The operator interface 21 includes a keyboard (not shown) for an operator to enter data into the encryption authority server 5 and a display (not shown) for allowing the operator to read data produced by the encryption authority server 5. The operator interface 21 also includes a CD-ROM reader-writer (not shown) via which data stored on a CD-ROM 31 can be input into the encryption authority server 5 or data produced by the encryption authority server 5 can be written onto a recordable CD-ROM 31.

The network interface 23 receives data from and outputs data to the Internet 3 in the form of network signals 33.

The processor 25 performs processing operations in accordance with program routines stored in memory 27. These program routines may be either stored during manufacture, or input to the encryption authority server 5 via the operator interface 21 or the network interface 23. The program routines process data stored in the memory 27 and data received by the encryption authority server 5 via the operator interface 21 and the network interface 23.

The memory 27 is formed by different types of memory having respectively different access times, and conventional processing techniques are employed to improve the speed of processing by caching data likely to be required into fast access time memory in advance.

The memory 27 includes a region 35 storing program routines used by the encryption authority server 5, a region 37 storing data and a region 39 providing working memory.

In particular, the program routines memory region 35 stores:

a Master_Control routine 41;
a Key_Maintenance sub-routine 43;
a Register_Client sub-routine 45;
a Supply_Private_Key sub-routine 47; and
a Supply_Root_Public_Key sub-routine 49.
The stored data memory region 37 stores:
a client database 51; and
a key database 53.

The Master_Control routine 41 co-ordinates the operations of the encryption authority server 5. This includes executing the sub-routines when required.

It will be appreciated that the security of the user private keys is reliant on the root private key $K^G_{pri}$ remaining secret. As a precautionary measure, in this embodiment the Key_Maintenance sub-routine is periodically executed to generate new core public and private keys which are stored in the key database 53 along with the old public and private keys. In particular, the key database 53 stores data indicating core public and private key pairs and for each pair the time period for which that pair was active.

The Register_Client sub-routine 45 is initiated by the Master_Control sub-routine 41 in response to a registration request received by a prospective client. The Register_Client sub-routine 45 stores data, including an email address, relating to the client in the client database 51, uses the Supply_Private_Key sub-routine 45 to calculate a client private key using the currently active core private key $K^G_{pri}$ corresponding to the email address for the client and supply the calculated client private key to the client. Subsequently, whenever the Key_Maintenance sub-routine 43 generates a new core private key $K^G_{pri}$, the Key_Maintenance sub-routine 43 uses the Supply_Private_Key sub-routine 47 to calculate the new client private key for each client based on the new core private key, and supply the newly calculated client private keys to the clients.

The Supply_Root_Public_Key sub-routine 49 is initiated by the Master_Control routine 41 in response to a request for a root public key $K^G_{pub}$, and supplies a public key certificate for the requested root public key $K^G_{pub}$.

The Client Computers

The main components of a computer 1, such as the sending computer 1a and the receiving computer 1b, will now be described with reference to FIGS. 3 to 5.

Figure 3:
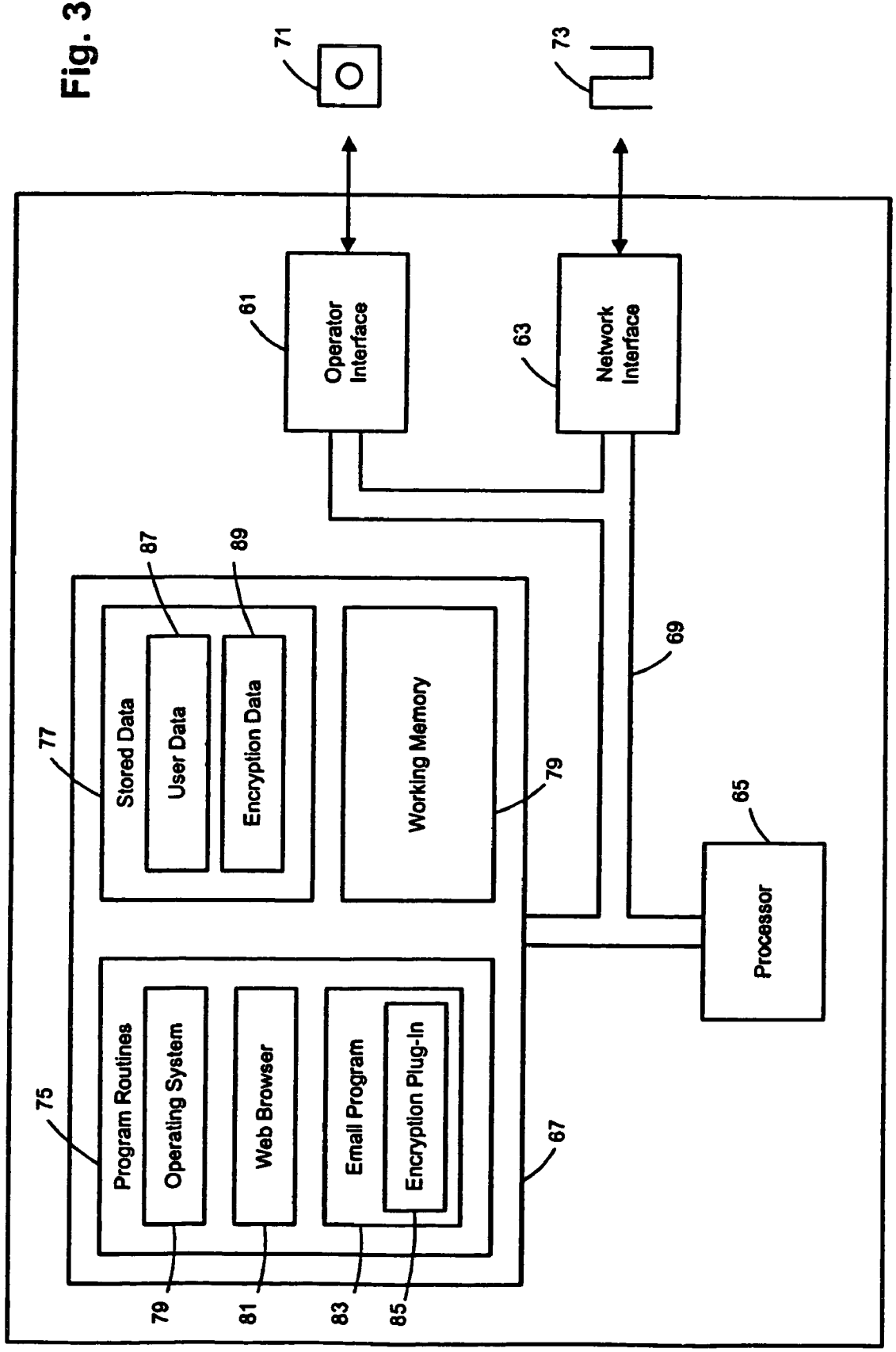
FIG. 3 schematically shows the main components of a client computer forming part of the software registration system illustrated in FIG. 1.

As shown in FIG. 3, a user computer 1 has an operator interface 61, a network interface 63, a processor 65 and memory 67 interconnected by a bus system 69.

The operator interface 61 includes a keyboard (not shown) for an operator to enter data into the computer 1 and a display (not shown) for allowing the operator to read data produced by the computer 1. The operator interface 61 also includes a CD-ROM reader-writer (not shown) via which data stored on a CD-ROM 71 can be input into the user computer 1 or data produced by the user computer 1 can be written onto a recordable CD-ROM 71.

The network interface 63 receives data from and outputs data to the Internet 3 in the form of network signals 73.

The processor 65 performs processing operations in accordance with program routines stored in the memory 67. These program routines may be either stored during manufacture, or input to the user computer 1 via the operator interface 61 or the network interface 63. The program routines process data stored in the memory 67 and data received by the computer 1 via the operator interface 61 and the network interface 63.

The memory 67 is formed by different types of memory having respectively different access times, and conventional processing techniques are employed to improve the speed of processing by caching data likely to be required into fast access time memory in advance.

The memory 67 includes a region 75 storing program routines which may be executed by the computer 1, a region 77 storing data and a region 79 providing working memory.

In particular, among other programs the program routines memory region 77 stores:
   a conventional operating system 79 such as Microsoft Windows;
   a conventional web browser 81 such as Microsoft Internet Explorer; and
   an email program 83 including an encryption plug-in 85.
Among other data, the stored data memory region stores:
user data 87; and
encryption data 89 storing data associated with the encryption plug-in 85.

Figure 4:
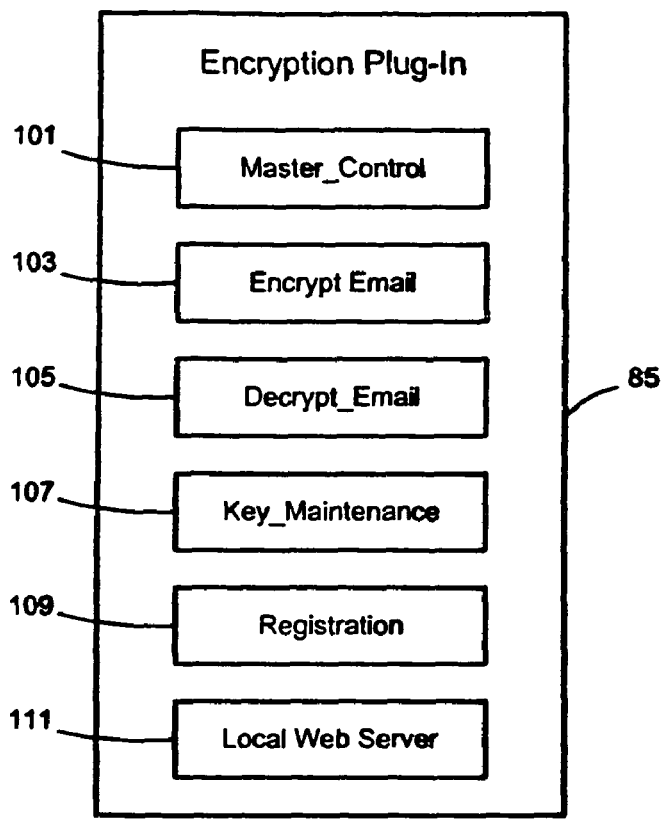
FIG. 4 schematically shows the main program routines of an encryption plug-in to an email program forming part of the client computer illustrated in FIG. 3.

FIG. 4 shows in more detail the program routines of the encryption plug-in 85. As shown, the encryption plug-in 85 includes:
   a Master_Control routine 101;
   an Encrypt_Email sub-routine 103;
   a Decrypt_Email sub-routine 105;
   a Key_Maintenance sub-routine 107;
   a Registration sub-routine 109; and
   a local web server 111.

Figure 5:
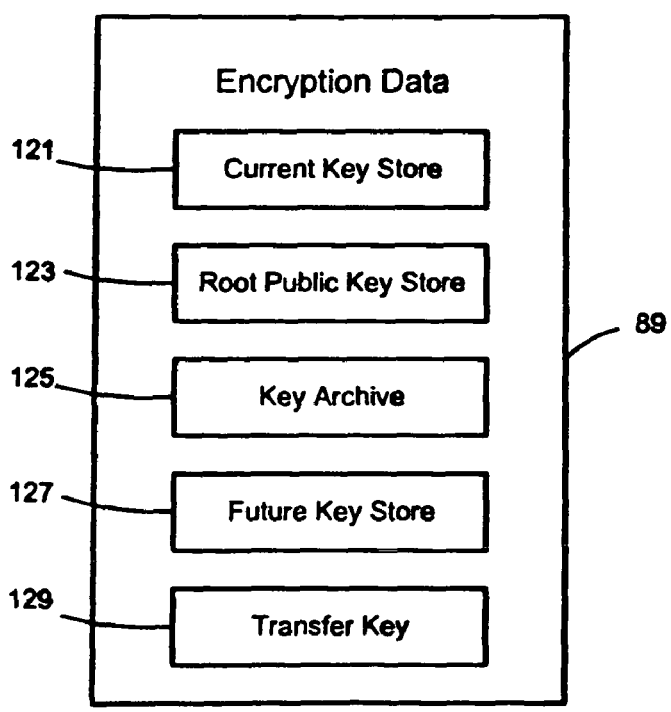
FIG. 5 schematically shows a map of data associated with the encryption plug-in which is stored in the client computer illustrated in FIG. 3.

FIG. 5 shows in more detail the encryption data 89. As shown, the encryption data 89 includes:
   a current key store 121;
   a root public key store 123;
   a key archive 125;
   a future key store 127; and
   a transfer key 129.

The Master_Control routines 101 controls the operations of the encryption plug-in 85, using the sub-routines as required.

The Encrypt_Email sub-routine 103 is used when the user of the computer 1 wishes to send an encrypted email. In this embodiment, the Encrypt_Email sub-routine 103 generates a random session key for the message, and then symmetrically encrypts the message using the generated session key to form a DEM-part of the encrypted message. The Encrypt_Email sub-routine 103 then calculates the public key associated with each recipient for the message (using the email address of the recipient and the core public key $K^G_{pub}$) and for each recipient asymmetrically encrypts the session key using the public key for that recipient. The Encrypt_Email sub-routine 103 then combines the resultant set of encrypted session keys with an encrypted session key formed by the session key encrypted using the public key associated with the sender (i.e. the user of the computer 1) to form a KEM-part of the encrypted message. The Encrypt_Email sub-routine 103 then combines the KEM-part and the DEM-part to form the encrypted message.

The Decrypt_Email sub-routine 105 is used to decrypt an encrypted email. The Decrypt_Email sub-routine 105 extracts from the KEM-part of the encrypted email the encrypted session key which was encrypted using the public key for the user of the computer 1. The Decrypt_Email sub-routine 105 then retrieves the user private key which was active at the time the message was sent, and asymmetrically decrypts the extracted encrypted session key using the retrieved user private key to recover the session key. The Decrypt_Email sub-routine 105 then decrypts the DEM-part of the received encrypted message using the recovered session key, and displays the decrypted message to the user.

Further details of the Encrypt_Email sub-routine 103 and the Decrypt_Email sub-routine 105 may be found in WO 2005/050908, the whole contents of which are hereby incorporated herein by reference.

The Key_Maintenance sub-routine periodically updates the root public key and the client public and private key pair in accordance with the updating of the root public and private key pair by the encryption authority. In particular, periodically the encryption authority server 5 sends a new client private key and a new root public key to the client computer 1, and these new claims are stored in the future key store 127. Then at a predetermined time the current cryptographic keys are shifted from the current key store 121 and root public key store 123 to the key archive 125, and are replaced by the corresponding keys in the future key store 127.

Client Registration

Figure 6A:
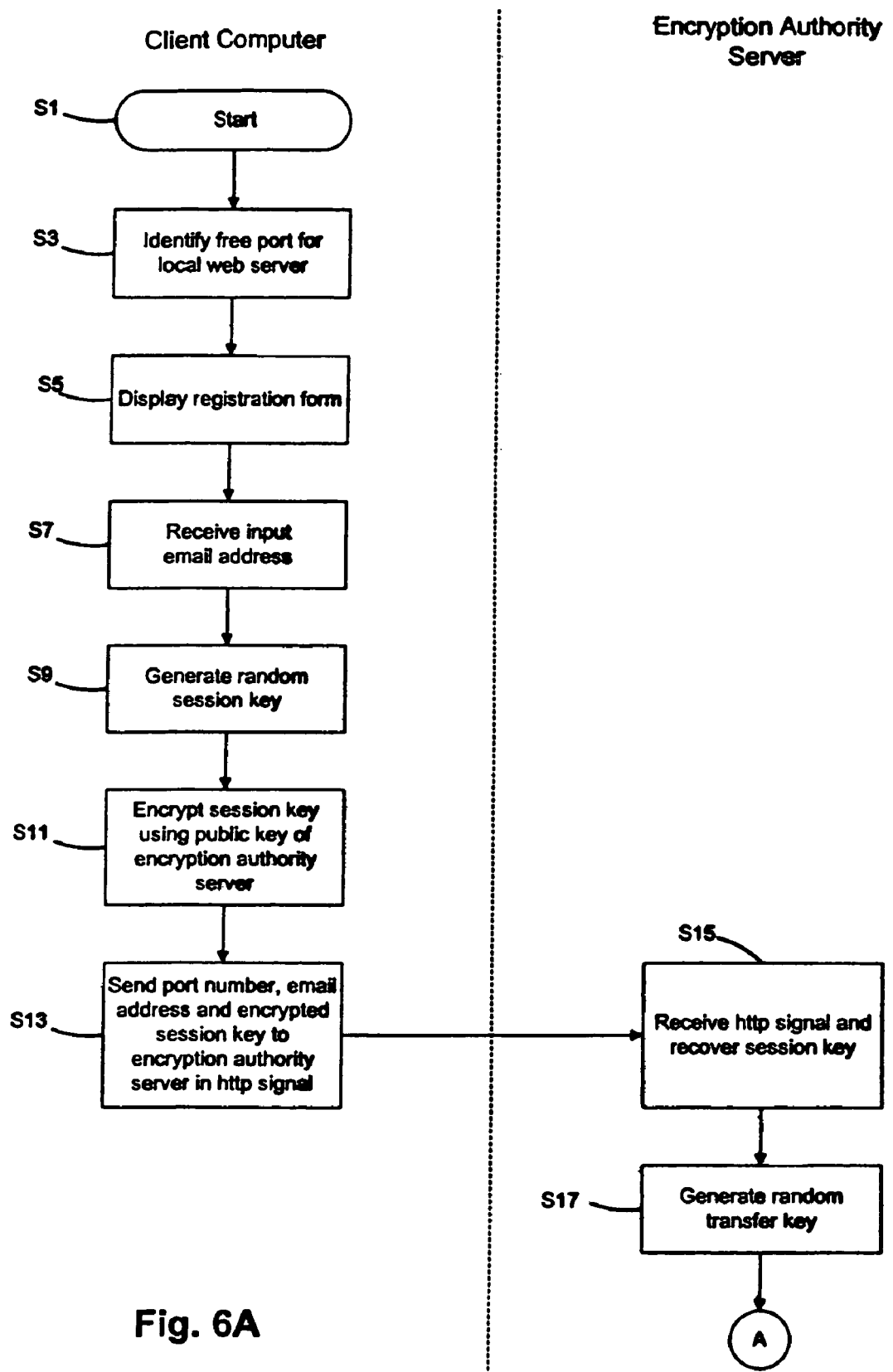
FIGS. 6A and 6B show a flow chart schematically indicating the main steps performed to register the encryption plug-in with the encryption authority server.
Figure 6B:
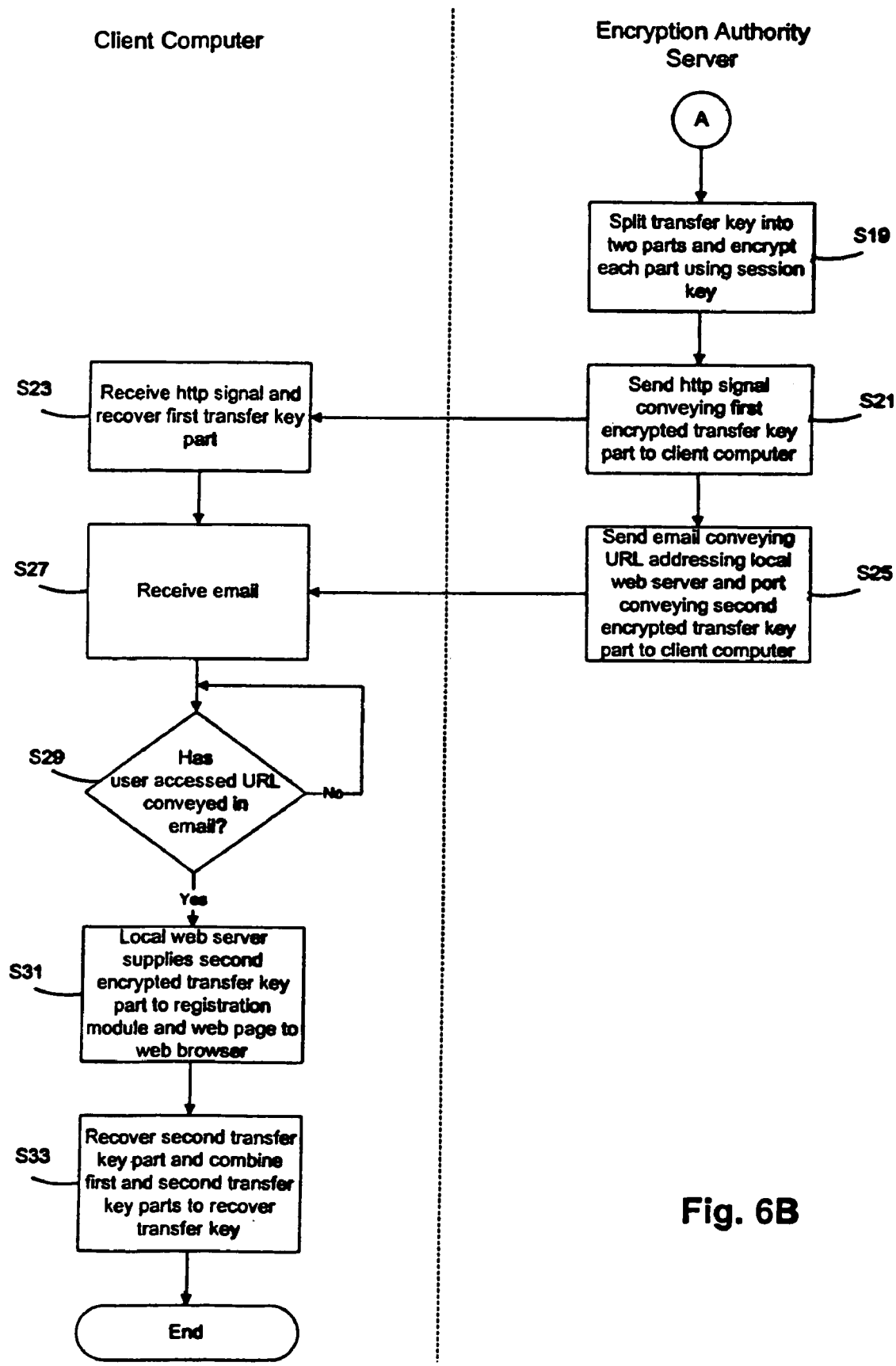

The Registration procedure will now be described with reference to FIGS. 6A and 6B.

In response to the user of the computer 1 requesting to activate the encryption plug-in 85, the Master_Control sub-routine 101 starts, at S1, the Registration sub-routine 109. The local web server 111 is then installed and the computer 1 identifies, at S3, a free port for use in communication with the local web server 111. The computer 1 then displays, at S5, a registration form including an input field for receiving the email address of the user of the computer 1.

After receiving, at S7, the user details input to the registration form including the user email address, the computer generates, at S9, a random session key and encrypts, at S11, the generated session key using a public key associated with the encryption authority server 5. The computer 1 then sends, at S13, an http request signal conveying a Uniform Resource Locator (URL) of the form:
   http://www.ea.com/reg?mail=a@b.com?key=12AB7?port=8080
where www.ea.com is network address information for the encryption authority server 5, mail=a@b.com is a query conveying the email address input by the user, key=12AB7 is a query conveying the encrypted session key, and port=8080 is a query conveying the port identified for communication with the local web server 111.

On receiving, at S15, the http signal from the computer 1, the encryption authority server 5 initiates a web service which executes the Register_Client sub-routine 45. The encryption authority server 5 decrypts the encrypted session key using a private key associated with the encryption authority to recover the session key, and then generates, at S17, a random transfer key. This random transfer key is used to encrypt using a symmetric encryption algorithm any client private key sent to the computer 1 for use with the input email address.

The encryption authority server 5 then splits, at S19, the transfer key into two parts and encrypts each part using the session key. The encryption authority server 5 then sends, at S21, the first encrypted transfer key part to the computer 1 in the form of a http response signal. On receiving, at S23, the http response signal, the computer 1 symmetrically decrypts the first encrypted transfer key part using the session key to recover the first transfer key part.

The encryption authority server 5 also sends, at S25, an email to the computer 1 conveying a URL which addresses the local web server 111 and conveying the second encrypted transfer key part. In particular, the URL is of the form:
   http://127.0.0.1:8080/?keypart=342A1 where 127.0.0.1 is conventionally the network address of a local web server, 8080 is the port identified for communication with the local web server, and keypart=342A1 is a query conveying the second encrypted transfer key part.

After receiving, at S27, the email, the computer 1 waits, at S29, until the user opens the email and accesses the URL conveyed by the email. In this embodiment, the email program 83 allows the user to use the web browser 81 to access the URL simply by clicking on the text of the URL in the email. Alternatively, the user can copy the text into the address field for the web browser 81. When the user accesses the URL, the local web server 111 supplies, at S31, the second encrypted transfer key part to the Registration sub-routine and supplies a web page to the web browser indicating that registration is complete.

The computer 1 then symmetrically decrypts, at S33, the second encrypted transfer key part using the session key to recover the second transfer key part, and combines the first transfer key part and the second transfer key part to recover the transfer key. The recovered transfer key is stored in the transfer key part 129 of the encryption data 89.

As described above, in order to recover the transfer key the user must have access to both the computer 1 and the email address which is used to generate the public key. Further, the user of the local web server 111 to extract the second encrypted transfer key part from the email provides a convenient mechanism which reduces the chance of user error.

Modifications and Further Embodiments

In the illustrated embodiment, the encryption authority appends part of a transfer key, used in the transmission of private keys, to a URL which is included in an email. This transfer key part is integral to the correct working of the encryption software.

In alternative embodiments, other types of installation information could be appended to the URL conveyed by the email. For example, the installation information may be a registration code issued by the registration authority which is required to activate a software package. In other embodiments, the computer on which the software package is being installed sends a random code to a server along with the user email address, the server appends the received random code to the URL, and the computer verifies that the received random code is the same as the sent random code. In all these cases, the computer is able to verify that the user of a software package on the computer has access to an email address which is requested by the software package during installation.

In the illustrated embodiment, the URL accesses a local web server. Those skilled in the art will be aware that such accessing is normally permitted by firewall software. When the web address for the local web server is accessed by a web browser, in addition to providing information required to complete installation of the software package to installation software, the local web server may supply data to the web browser for a web page displaying installation information to the user.

In the illustrated embodiment, the encryption authority server 5 generates a root private key and root public key pair. This generation involves some form of random number generation so that the generated keys are not predefined. Once the root private key is generated, the user private keys can be calculated from the root private key and some form of identifier for the user. Similarly, once the root public key is generated the user public keys can be calculated from the root public key and the identifier for the user. In particular, calculation of the user private and public keys does not require any random number generation and it is a repeatable calculation yielding the same result each time whenever and wherever it is performed.

In the illustrated embodiment, the asymmetric encryption algorithm discussed in WO 03/017559 is used. It will be appreciated that alternative algorithms with the same overall functionality could be used, for example the algorithm discussed in "ID based cryptosystems with pairing on elliptic curve" by R. Sakai and M. Kasahara, Cryptology ePrint archive, Report 2003/054 and the algorithm discussed in "An Efficient ID-KEM Based On the Sakai-Kasahara Key Construction" by Chen et al, Cryptology ePrint archive, Report 2005/224 (both of which publications are hereby incorporated herein by reference).

Further, the asymmetric encryption algorithm need not determine the public key for a client using the client identity, and any asymmetric encryption algorithm, for example the RSA algorithm, could be used.

While in the illustrated embodiment symmetric encryption is performed using the AES encryption algorithm, it will be appreciated that other symmetric encryption algorithms could be used, for example the DES algorithm.

In the illustrated embodiment, the user computers are conventional personal computers. It will be appreciated that such personal computers may be, for example, of the laptop or desktop variety. Further, the user computer could be formed by other types of computer apparatus such as a thin client or a personal digital assistant (PDA).

Although the illustrated embodiment of the invention comprises computer apparatus (such as personal computers and servers) and processes performed in the computer apparatus, the invention also extends to computer programs, particularly computer programs on or in a carrier, adapted for putting the invention into practice. The program may be in the form of source code, object code, a code intermediate source and object codes such as in a partially compiled form, or in any other form suitable for using the implementation of the processes according to the invention.

The carrier may be any entity or device capable of carrying the program. For example, the carrier may comprise a storage medium, such as a ROM, for example a CD-ROM or a semiconductor ROM, or a magnetic recording medium, for example a floppy disk, or a hard disk. Further, the carrier may be a transmissible carrier such as an electronic or optical signal which may be conveyed via electrical or optical cable or by radio or other means.

When the program is embodied in a signal which may be conveyed directly by cable or other device or means, the carrier may be constituted by such cable or other device or means. Alternatively, the carrier may be an integrated circuit in which the program is embedded, the integrated circuit being adapted for performing, or for use in the performance of, the relevant processes.

Although in the described embodiments the invention is implemented using software, it will be appreciated that alternatively the invention could be implemented using hardware devices, or a combination of hardware devices and software.

The invention claimed is:

1. A computer network system comprising:
   a computer associated with a user of a software package, the computer having a web browser stored thereon and the software package including installation software and a local web server, wherein said installation software is operable, when executed, to send a hypertext transfer protocol (HTTP) request signal conveying a first uniform resource locator (URL) of a server, an electronic mail address associated with the user, and a port number for communication with the local web server; and the server, the server being associated with a registration authority for the software package, wherein the server is operable, in response to receipt of the HTTP request signal, to generate a transfer key, to send an HTTP response signal conveying a first part of the transfer key to the computer, and to send an electronic mail message to said electronic mail address, the electronic mail message conveying a second URL addressing the local web server and conveying a second part of the transfer key, wherein in response to the web browser of the computer accessing the local web server using said second URL, the local web server is operable to convey the second part of the transfer key to the installation software.

2. The computer network system according to claim 1, wherein the software package comprises encryption software operable to encrypt outgoing electronic mail messages using a public key associated with a recipient and to decrypt incoming electronic mail messages using a private key associated with the user of the software package.

3. The computer network system according to claim 2, wherein the encryption software is operable to calculate the public key for the recipient using the electronic mail address for the recipient.

4. The computer network system according to claim 2, wherein said installation information comprises cryptographic key information associated with a cryptographic key for use during transmission of said private key associated with the user of the software package to the computer.

5. The computer network system according to claim 4, wherein the cryptographic key information comprises part of the cryptographic key, and wherein the server is operable to convey another part of the cryptographic key to the computer as part of a network signal addressed to the computer.

6. A storage device storing a software package comprising a local web server and installation software, wherein the installation software comprises instructions for programming a programmable processing apparatus on which the software package is to be installed to send a hypertext transfer protocol (HTTP) request signal to a remote server, the HTTP request signal conveying an electronic mail address associated with a user of the software package and a port number for communication with the local web server, to receive an HTTP response signal responsive to the HTTP request signal, the HTTP response signal conveying a first part of a transfer key, and wherein the local web server comprises instructions for programming the programmable processing apparatus to, in response to being accessed by a web browser using a uniform resource locator comprising an address of the local web server and a second part of the transfer key, convey the second part of the transfer key to the installation software.

7. The storage device according to claim 6, wherein the software package comprises instructions for programming a programmable processing apparatus to encrypt outgoing electronic mail messages using a public key associated with a recipient and to decrypt incoming electronic mail messages using a private key associated with the user of the software package.

8. The A storage device according to claim 7, wherein the software package comprises instructions for programming a programmable processing apparatus to calculate the public key for the recipient using the electronic mail address for the recipient.

9. The storage device according to claim 7, wherein the software package comprises instructions for programming a programmable processing apparatus to recover a cryptographic key using said installation information, the cryptographic key being for use during transmission of said private key associated with the user of the software package to the programmable processing apparatus.

10. The storage device according to claim 9, wherein the installation information comprises a first part of the cryptographic key, and wherein the software package comprises instructions for programming a programmable processing apparatus to recover a second part of the cryptographic key from a network signal sent to the programmable processing apparatus, and to calculate said cryptographic key using said first and second parts of the cryptographic key.

11. A server associated with a registration authority for a software package, the server comprising:
    a network interface;
    a uniform resource locator (URL) generator operable to generate a a URL addressing a local web server in a remote network apparatus and comprising a second part of a transfer key; and
    an electronic mail message generator operable, in response to a hypertext transfer protocol (HTTP) request signal received from the remote network apparatus via the network interface conveying an electronic mail address associated with a user of the software package and a port number for communication with the local web server, to generate an electronic mail message conveying said URL and to send said generated electronic mail message to said electronic mail address associated with the user of the software package, wherein the server sends a first part of the transfer key to the remote network apparatus by way of an HTTP response signal sent by the server to the remote network apparatus in response to the HTTP request signal.

12. The server according to claim 11, wherein the installation information comprises cryptographic key information associated with a cryptographic key, and wherein the server is operable to use said cryptographic key to establish a secure transmission link in order to convey a private key associated with said user of the software package to said user.

13. The server according to claim 12, wherein the server is operable to calculate the private key for said user using the electronic mail address associated with said user.

14. The server according to claim 12, wherein the cryptographic key information comprises a first part of the cryptographic key, and wherein the server is operable to send a network signal to said remote network apparatus conveying a second part of the cryptographic key.

* * * * *